United States Patent
Ellsworth

(10) Patent No.: US 6,540,196 B1
(45) Date of Patent: Apr. 1, 2003

(54) BREAK AWAY SUPPORT STRUCTURE COUPLING

(75) Inventor: Steven James Ellsworth, Newport Beach, CA (US)

(73) Assignee: Western Highway Products, Inc., Stanton, CA (US)

( * ) Notice: Subject to any disclaimer, the term of this patent is extended or adjusted under 35 U.S.C. 154(b) by 0 days.

(21) Appl. No.: 10/068,818

(22) Filed: Feb. 6, 2002

(51) Int. Cl.$^7$ ................................................. E01F 9/018
(52) U.S. Cl. ....................... 248/548; 248/900; 256/13.1; 403/2; 52/98
(58) Field of Search ................................ 248/548, 900; 52/98; 403/2; 256/13.1

(56) References Cited

U.S. PATENT DOCUMENTS

| | | |
|---|---|---|
| 2,337,626 A | 12/1943 | Sawyer |
| 2,961,204 A | 11/1960 | Rayfield et al. |
| 3,307,833 A | 3/1967 | Müller et al. |
| 3,349,531 A | 10/1967 | Watson |
| 3,499,630 A | 3/1970 | Dashio |
| 3,521,413 A | 7/1970 | Scott et al. |
| 3,521,917 A | 7/1970 | King |
| 3,628,296 A | 12/1971 | Henry |
| 3,630,474 A | 12/1971 | Minor |
| 3,637,244 A | 1/1972 | Strizki |
| 3,713,262 A | 1/1973 | Jatcko |
| 3,837,752 A * | 9/1974 | Shewchuk ............... 403/2 |
| 3,951,556 A | 4/1976 | Strizki |
| 3,967,906 A | 7/1976 | Strizki |
| 4,021,977 A | 5/1977 | Deike |
| 4,071,970 A | 2/1978 | Strizki |
| 4,154,037 A | 5/1979 | Anderson |
| 4,183,695 A | 1/1980 | Wilcox |
| 4,204,589 A * | 5/1980 | Loker et al. ............... 192/27 |
| 4,278,228 A | 7/1981 | Rebentisch et al. |
| 4,310,979 A | 1/1982 | Bloom |
| 4,638,608 A | 1/1987 | Coy |
| 4,737,048 A * | 4/1988 | Herrstrom ............... 403/229 |
| 4,793,111 A | 12/1988 | Shewchuk |
| 4,926,592 A * | 5/1990 | Nehls ............... 52/98 |
| 4,938,622 A * | 7/1990 | Stoerzbach ............... 403/2 |
| 5,772,172 A * | 6/1998 | Sampedro et al. ............... 248/415 |
| 5,855,443 A * | 1/1999 | Faller et al. ............... 403/2 |
| 6,068,233 A * | 5/2000 | Green ............... 248/548 |
| 6,308,927 B1 * | 10/2001 | Leahy ............... 248/548 |
| 6,422,783 B1 * | 7/2002 | Jordan ............... 404/9 |

FOREIGN PATENT DOCUMENTS

| | | | |
|---|---|---|---|
| GB | 688041 | * 2/1953 | ............... 248/548 |
| GB | 879336 | * 10/1961 | ............... 248/900 |

OTHER PUBLICATIONS

U.S. patent application Publication No. 2002/0121036, Published Sep. 5, 2002, Dicke et al., filed Dec. 20, 2001.*

* cited by examiner

*Primary Examiner*—Ramon O. Ramirez
*Assistant Examiner*—Jon Szumny
(74) *Attorney, Agent, or Firm*—Christie, Parker & Hale, LLP

(57) ABSTRACT

A breakaway coupling for a support structure having a first post and a second post, where the breakaway coupling has a first plate coupled to the first post, a second plate coupled to the second post and breakably coupled to the first plate, and a bearing positioned between the first plate and the second plate having a bearing member located in an opening of the bearing housing and contacting at least one of the first and second plates.

16 Claims, 7 Drawing Sheets

BREAK AWAY SUPPORT STRUCTURE COUPLING

BACKGROUND OF THE INVENTION

This invention relates to a support structure for highway signs, or other similar roadside fixtures. More particularly, the present invention relates to a breakaway coupling to be interposed in a portion of a support structure that allows severing of a first portion of the support structure from a second portion of the support structure upon an impact.

There are many support post structures erected along highways for holding up signs, lights, and other objects. It is desirable to have the support structures for many of these items breakable upon impact with a vehicle on the highway. By making support structures breakable upon impact, the amount of damage to the vehicle and its occupants upon impact is reduced. In the past, support structures were provided with some type of breakaway feature which allows the support structure to break off or bend away when hit by a vehicle with a predetermined impact force.

Some devices required shearing of the support structure itself at a weakened portion or the shearing of other members such as shear pins. While this type of breakaway feature eliminates certain hazards, unfortunately, such resistance to breaking or bending caused the impact to do substantial damage to the vehicle with possible serious injuries to the occupants of the vehicle. Additionally, the impact often destroyed the support structure so that complete replacement was necessary. It is therefore desirable to provide an improved way to break away a support structure upon impact with a vehicle to minimize damage to the vehicle and the occupants and to permit re-use of portions of the support structure.

SUMMARY OF THE INVENTION

The present invention, according to one embodiment is directed to a breakaway coupling for a support structure having a first portion and a second portion. The breakaway coupling has a first mounting member. The first mounting member is mountable to the first portion of the support structure. A first plate is coupled to the first mounting member and a second plate is breakably coupled to the first plate. A second mounting member is coupled to the second plate; the second mounting member being mountable to the second portion of the support structure. A bearing is positioned between the first plate and the second plate.

In one embodiment, the bearing has a bearing housing, which includes a first bearing retainer layer positioned adjacent to the first plate, a second bearing retainer layer positioned adjacent to the second plate, and a third bearing retainer layer positioned between the first bearing retainer layer and the second bearing retainer layer. The first bearing retainer layer, the second bearing retainer layer and the third bearing retainer layer can be all made of polypropylene. At least one of the first plate, the second plate, the first bearing retainer layer, the second bearing retainer layer and the third bearing retainer layer may be hexagonally shaped. The bearing may include a plurality of ball bearings positioned inside of the bearing housing. In one embodiment, the bearing has six ball bearings. The bearings may be made of steel.

In one embodiment, the first mounting member is welded to the first plate and the second mounting member is welded to the second plate. The first plate may be breakably coupled to the second plate by a plurality of nuts and bolts. The first mounting member having a plurality of holes is coupled to the first portion of the support structure using at least one bolt passed through at least one of the plurality of holes in the first mounting member. Likewise, the second mounting member comprises a plurality of holes and is coupled to the second portion of the support structure using at least one bolt passed through at least one of the plurality of holes in the second mounting member.

BRIEF DESCRIPTION OF THE DRAWINGS

These and other features, aspects, and advantages of the present invention will become better understood with regard to the following description, appended claims, and accompanying drawings wherein:

DETAILED DESCRIPTION

The detailed description set forth below, in connection with the appended drawings, is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Figure 1:
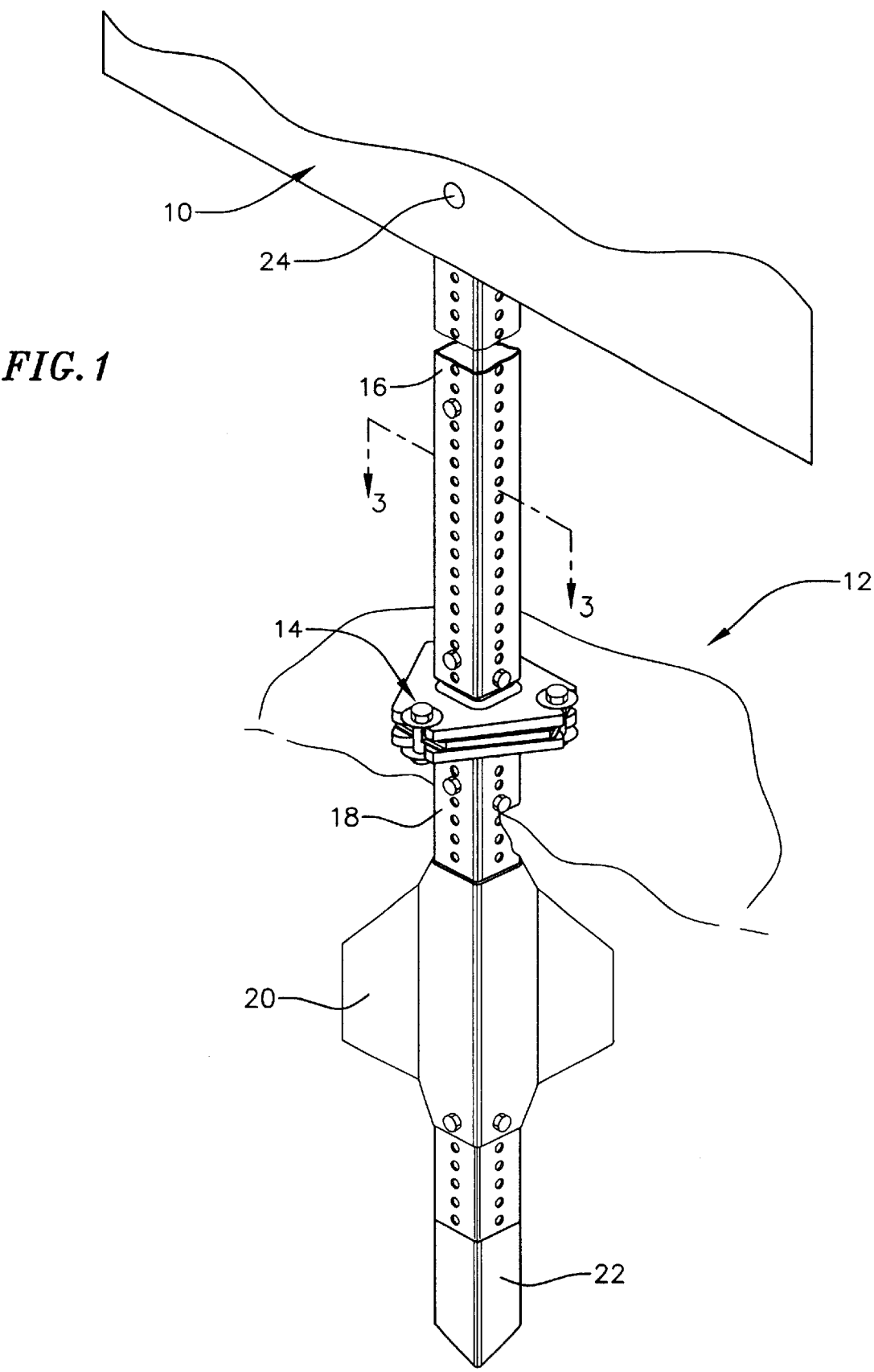
FIG. 1 is a perspective view of a road sign having a support structure with a breakaway coupling according to an embodiment of the present invention.

According to an exemplary embodiment, as shown in FIG. 1, a road sign 10 is mounted on a support structure 12 incorporating a breakaway coupling 14. Considering FIG. 1, the road sign 10 is attached to an upper mounting post 16 of the support structure 12. The upper mounting post 16 fits over, and is attached to, the breakaway coupling 14. The breakaway coupling 14 fits inside of, and is attached to, a lower support post 18 of the support structure 12. The lower support post 18, as shown in FIG. 1, is designed to sit in the ground and is attached to both a soil stabilizer 20 and an anchor 22. The anchor 22 telescopes inside of the lower support post 18 to provide a reinforced support tube.

The road sign 10 may be made from steel or aluminum or other suitable material and may be coupled to the upper mounting post 16 of the support structure using a fastener such as a rivet, screw, or nut and bolt, or using an adhesive. Instead of a sign, a light or other fixture, such as a telephone, may be attached to the upper support structure. In the exemplary embodiment, shown in FIG. 1, the sign 10 is made of aluminum and is attached to the upper mounting post 16 of the support structure using a rivet 24.

The upper mounting post 16 and lower support post 18 of the support structure are each formed as a piece of tubing. In the exemplary embodiment of FIG. 1, the tubing is square in cross section and has a multitude of holes. Alternatively, the tubing may be circular, rectangular, oval or other suitable shape in cross section and may not be perforated. The upper mounting post 16 and lower support post 18 of the support structure may be made from any of several metals, such as aluminum and steel. Alternatively, the upper and lower posts of the support structure may be made from wood, plastic, or fiberglass.

Figure 2:
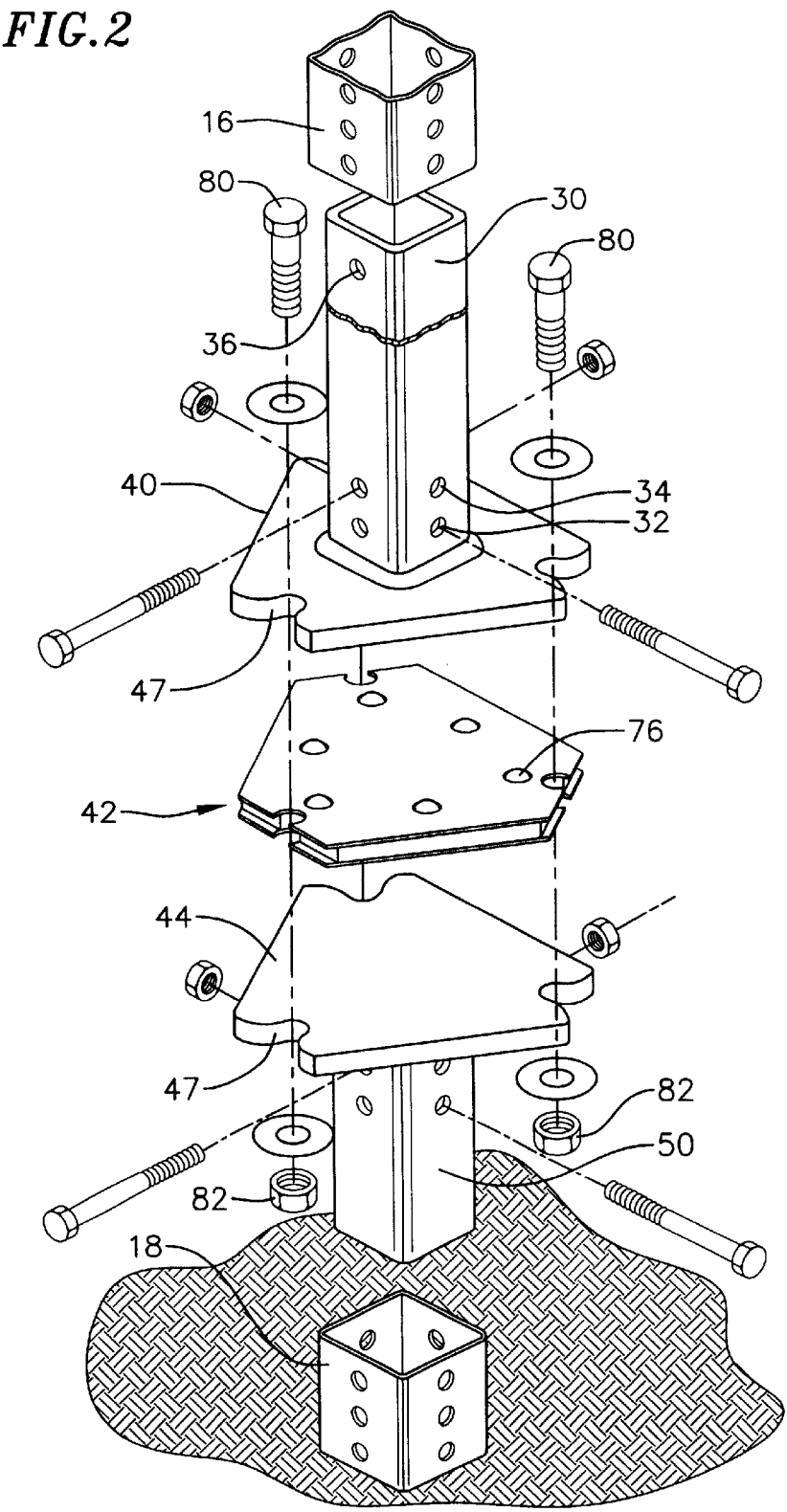
FIG. 2 is an exploded view of the support structure with breakaway coupling of FIG. 1.

Considering the breakaway coupling in more detail, as shown in FIG. 2, an upper mounting member 30 fits inside of, and is coupled to, the upper post 16 of the support structure. According to an exemplary embodiment, the upper mounting member 30 is a tube made of steel having a square cross section and having several holes. In alternative embodiments, the upper mounting member 30 may be rectangular, round, oval or other shape in suitable dimensions to fit inside of the upper post 16 of the support structure. In yet another alternative embodiment, the upper mounting member may be dimensioned to fit around the outside of the upper post of the support structure.

Figure 3:
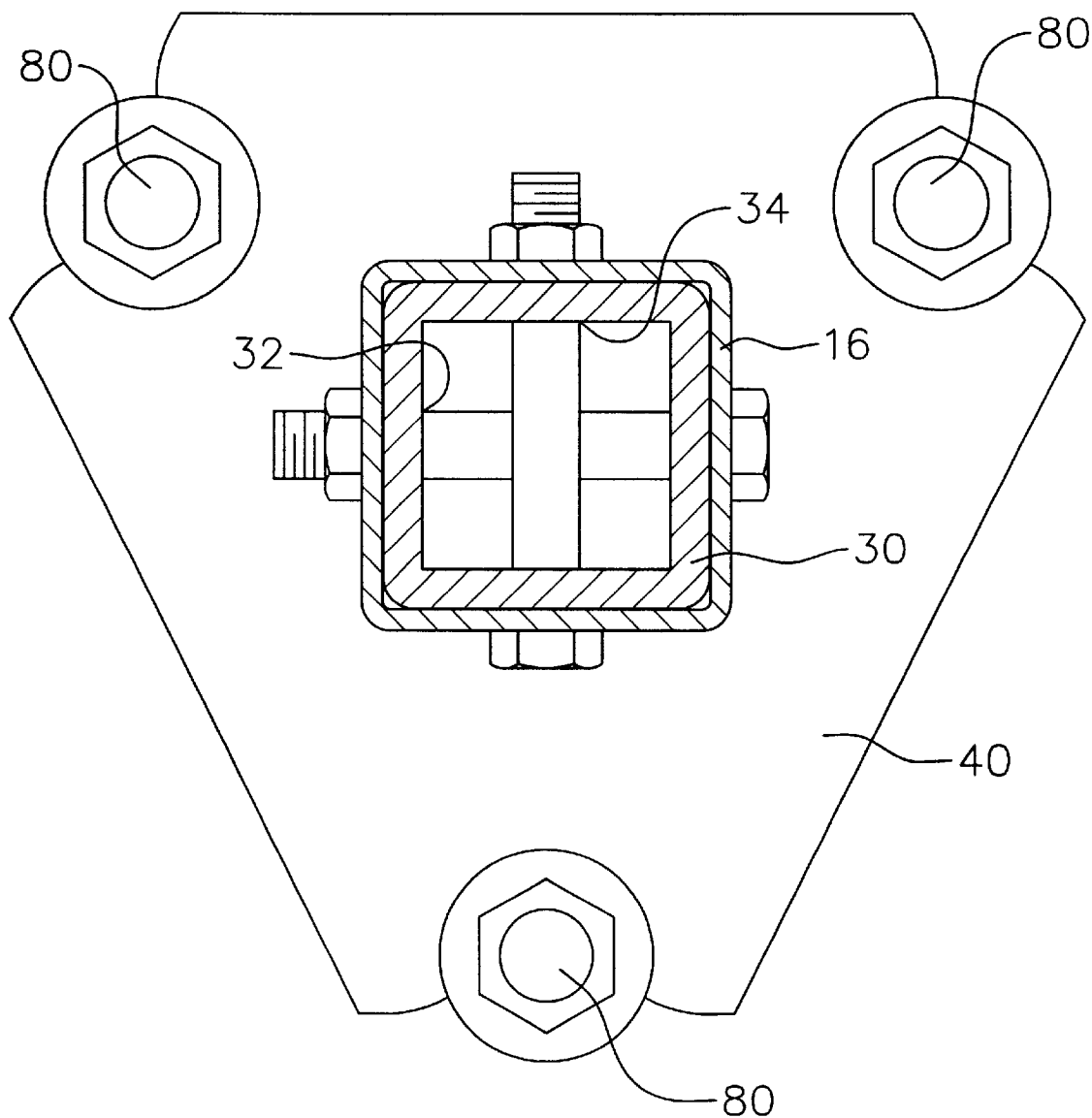
FIG. 3 is a sectional plan view of the support structure with breakaway coupling of FIG. 1 taken along line 3—3 of FIG. 1.

The upper mounting member 30 is coupled to the upper post 16 of the support structure using a fastener. In an exemplary embodiment, the upper mounting member 30 has three sets of holes for attaching the upper mounting member 30 to the upper post 16 of the support structure. A first set of holes 32 is positioned approximately one inch from a first end of the upper mounting member 30. A second set of holes 34 is positioned approximately two inches from the first end 36 of the upper mounting member 30. A third set of holes 36 is positioned approximately one inch from a second end of the upper mounting member 30. Fasteners are run through each set of holes 32, 34, 36, and through corresponding holes in the upper post 16 of the support structure (See FIG. 3). The upper mounting member 30 is welded to an upper plate 40. In another embodiment, the upper post 16 may be fastened to the upper plate 40, without using the tubular upper mounting member 30, which serves to reinforce the upper post. The mounting member may be a plate, angle or other fastening mechanism to connect the upper post to the upper plate.

A lower plate 44 is welded to a lower mounting member 50. The lower mounting member 50 according to an exemplary embodiment is a tube made of steel having a square cross section and several holes. In alternative embodiments, the lower mounting member 50 may be rectangular, round, oval or other shape in suitable dimensions to fit inside of the lower post 18 of the support structure. In yet another alternative embodiment, the lower mounting member 50 may be dimensioned to fit on the outside of the lower post 18 of the support structure.

The lower mounting member 50 is coupled to the lower post 18 of the support structure using a fastener. In an exemplary embodiment, the lower mounting member 50 has two sets of holes for attaching the lower mounting member 50 to the lower post 18 of the support structure. A first set of holes is positioned approximately one inch from the a first end of the lower mounting member 50. A second set of holes is positioned approximately two inches from the first end of the lower mounting member 50. A fastener is run through each of the sets of holes and through corresponding holes in the lower post 18 of the support structure.

Figure 4:
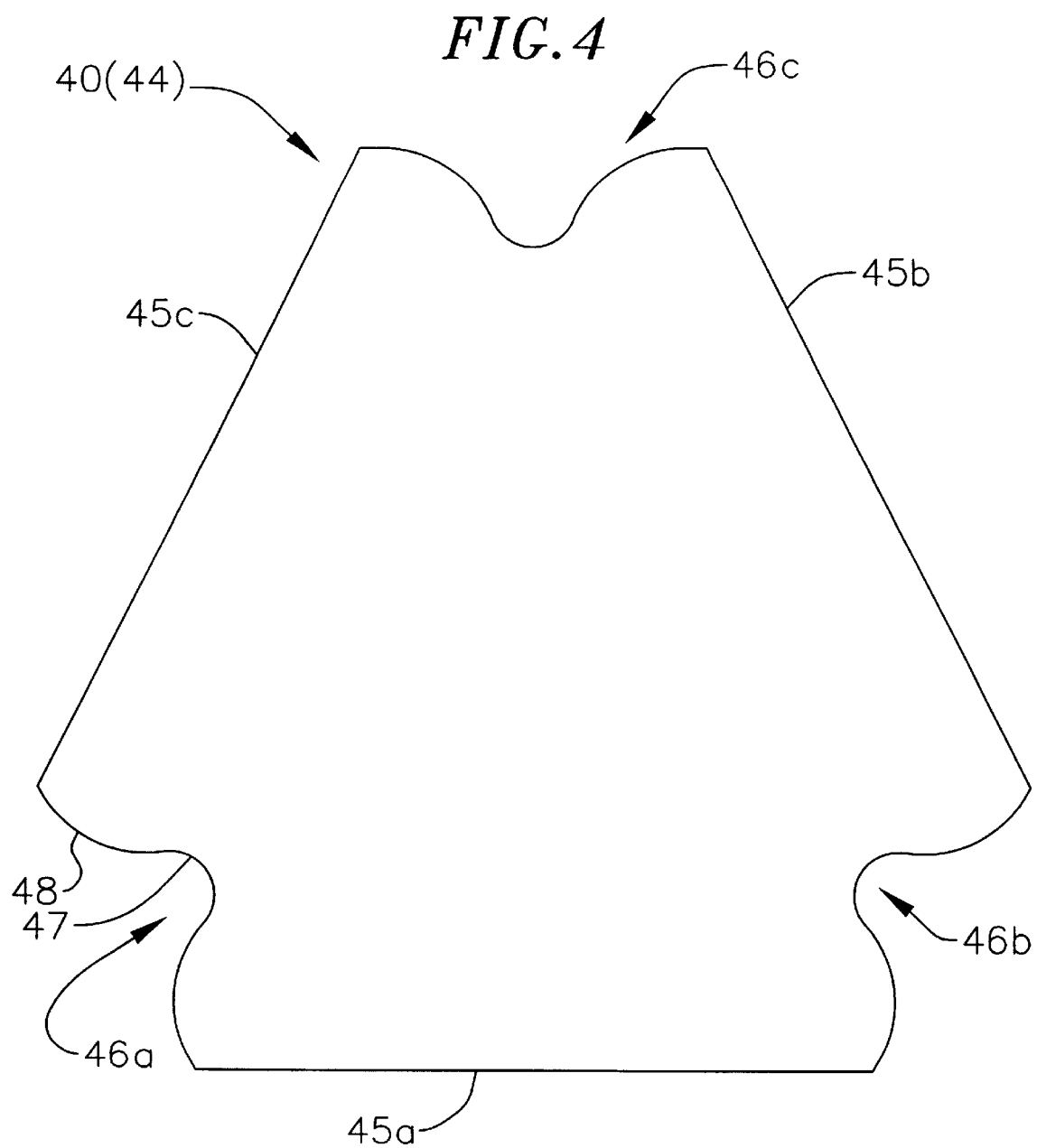
FIG. 4 is a plan view of a plate for use as either a top plate or a bottom plate according to an embodiment of the present invention.

As shown in FIG. 4, both the upper plate 40 and the lower plate 44 are generally hexagonal with three longer sides 45a, 45b, 45c, each of which is adjacent to two shorter sides 46a, 46b, 46c. According to an exemplary embodiment, the short sides 46a, 46b, 46c are provided with a deep notch 47 having a relatively wide spread 48 extending from the base of the notch to permit a fastener to fit securely at the base of the notch, but to readily slide out of the notch upon separation of the upper portion from the lower portion of the support structure during a collision. In an exemplary embodiment, the upper and lower plates are ½" thick steel plates.

A bearing housing 42 is placed between the upper plate 40 and the lower plate 44 (see FIG. 2). According to an exemplary embodiment, the bearing housing 42 is a ½" thick hexagonal polypropylene ball bearing housing.

Figure 5:
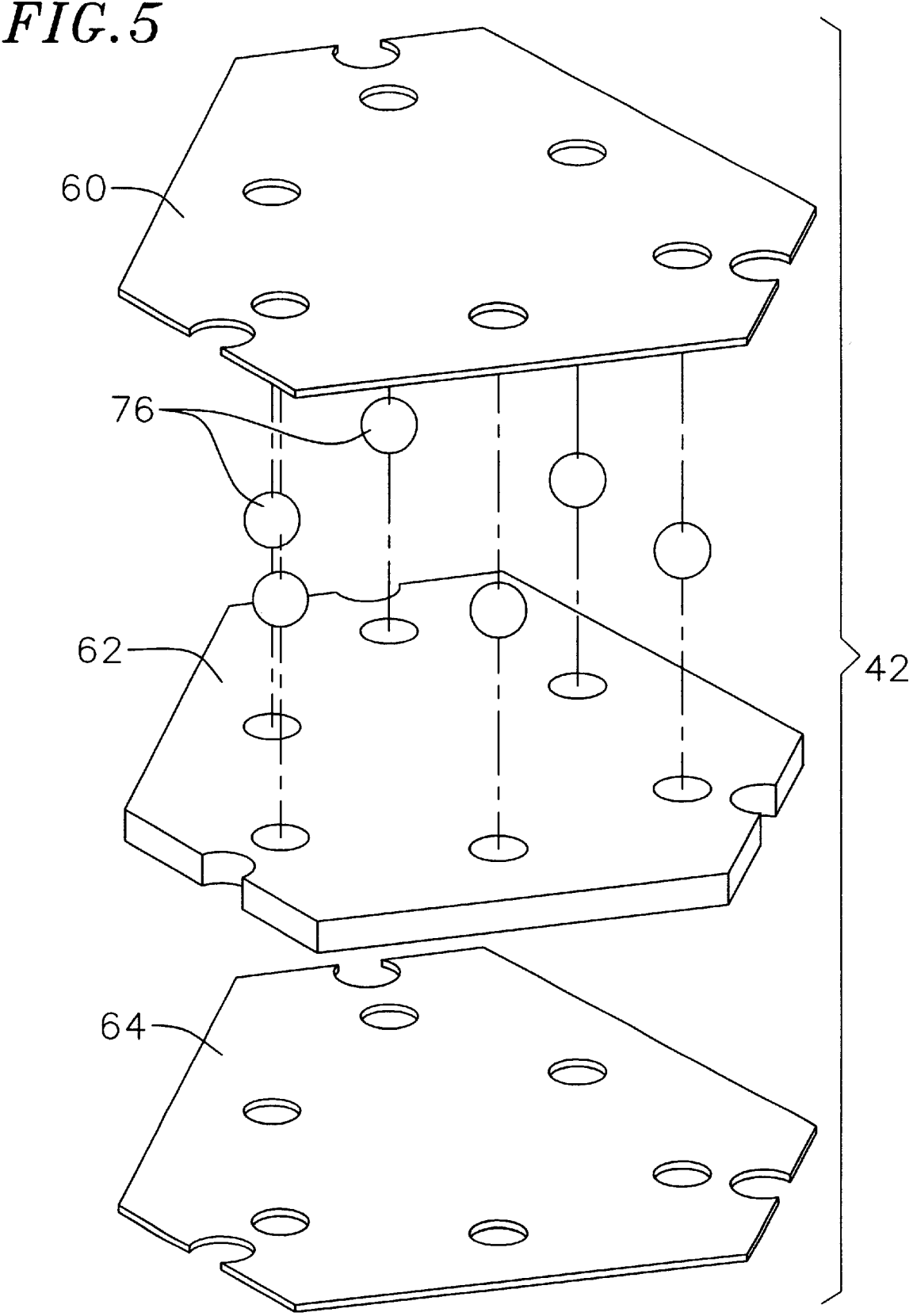
FIG. 5 is an exploded view of a bearing housing according to an embodiment of the present invention.
Figure 6:
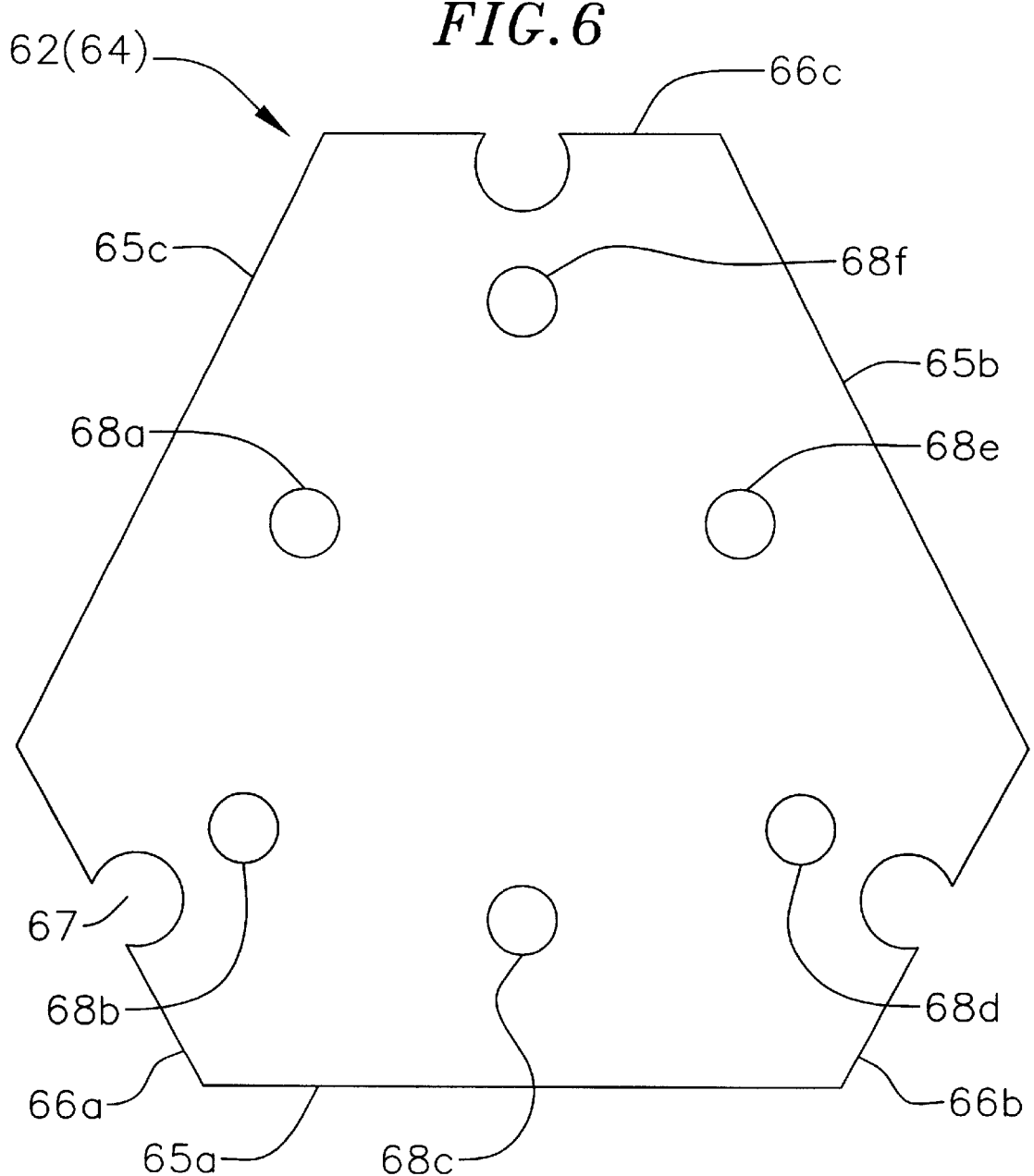
FIG. 6 is a plan view of a bearing retainer for use as either a top or bottom bearing retainer according to an embodiment of the present invention.

Considering an exemplary embodiment of the bearing housing 42 in more detail, as shown in FIG. 5, the bearing housing 42 has an upper bearing retainer layer 60, bearing elements 76, a middle bearing retainer layer 62, and a lower bearing retainer layer 64. In an exemplary embodiment, shown in FIG. 6, the upper bearing retainer layer 62 and the lower bearing retainer layer 64 are both 1/16" thick hexagon shaped pieces of polypropylene. The hexagon has three longer sides 65a, 65b 65c, each of the longer sides being adjacent to two shorter sides 66a, 66b, 66c.

Each of the shorter sides contain 66a, 66b, 66c a partial circular opening 67 at the center of their outside edge. The openings 67 may be sized to permit a fastener to snap into each opening, which more readily releasably secures the fasteners in place. Additionally, each of the upper and lower layers 60, 64 contain holes 68 for holding bearing elements. The diameter of the holes is slightly smaller than the diameter of the bearing elements in order to retain the elements in the bearing housing. In an exemplary embodiment, each of the upper and lower layers 60, 64 contains six holes 68a–f. Each of the six holes 68a–f is positioned in the center of a side.

Figure 7:
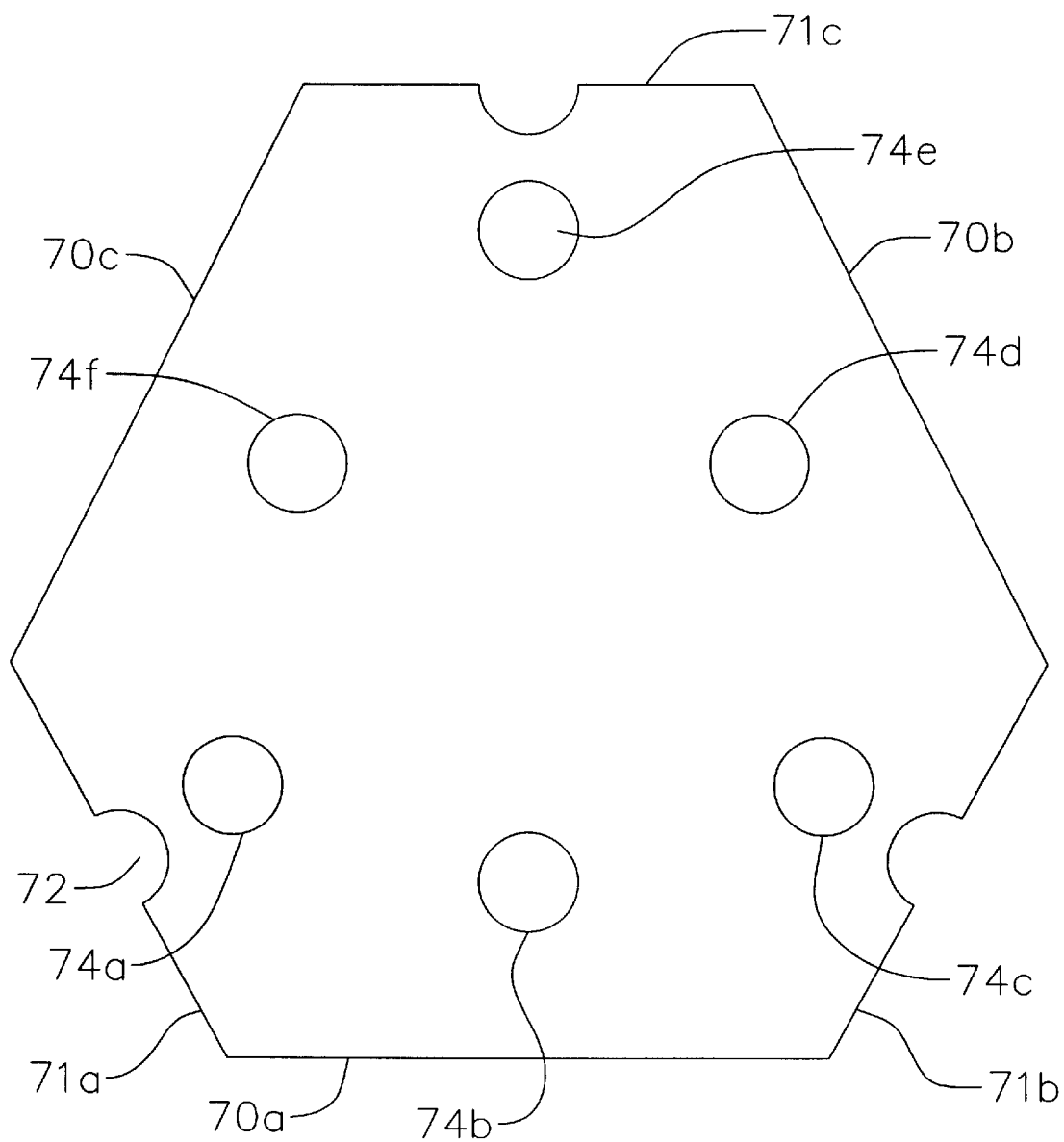
FIG. 7 is a plan view of a middle ball bearing retainer according to an embodiment of the present invention.

In an exemplary embodiment, shown in FIG. 7, the middle bearing retainer layer 62 is a ⅜" thick hexagon shaped piece of polypropylene. The hexagon has three longer sides 70a, 70b, 70c, each longer side being adjacent to two shorter sides 71a, 71b, 71c.

Each of the shorter sides 71a, 71b, 71c contain a semi-circular opening 72 at the center of their outside edge. The middle bearing retainer layer 62 also has bearing element holes 74a–f. The diameter of the holes is slightly larger than the diameter of the bearing elements. Each of the six holes 74a–f are positioned in the center of a side. The upper and lower bearing retainer layers are fastened to the middle bearing layer by any suitable method such as gluing or sonic welding.

In an exemplary embodiment, six ball bearings 76 are positioned in the six holes contained in the upper, middle, and lower bearing retainer layers 60, 62, 64. In an exemplary embodiment, the six ball bearings 76 have a diameter slightly larger than the thickness of the bearing housing 42 (e.g., 17/32").

The upper plate 40 and the lower plate 44 are fastened to each other with the bearing housing retainer 42 in between (See FIG. 2). Three bolts 80 are positioned to travel through the short sides of each of the upper and lower plates 40, 44 as well as the upper, middle and lower, bearing retainer layers 60, 62, 64. In an exemplary embodiment, the bolts 80 are coupled to nuts 82, which may be tightened to varying torque levels depending on how much force is desired to break apart the coupling.

When the supporting structure 12 is subjected to a vehicular impact, the upper mounting member 30 and the upper plate 40 will be moved on the bearing housing 42 relative to the lower plate 44 and the lower mounting member 50. The relative movement causes the bolt 80 and nut 82 assemblies to move out of the notches 47 of the upper plate 40 and the lower plate 44.

Typically, in a collision, impact occurs at a standard bumper height of about 16 inches above ground which would be about one foot above the center of the breakaway coupling 14. The impact moves the upper post 16 of the support structure away from the lower post 18, separating the upper post 16, the upper mounting member 30 and the upper plate 40 from the lower plate 44, the lower mounting member 50 and the lower post 18 of the supporting structure. The bolt 80 and nut 82 assemblies move away from the bearing housing 42. The breakaway coupling of this invention is readily applied to new installation or to retrofitting in existing installations. The breakaway coupling may be used in a single post installation or a multiple post installation.

Although an exemplary embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A breakaway coupling for a support structure having an upper mounting post and a lower support post comprising:
    a first mounting member mountable to the upper mounting post of the support structure;
    a first plate coupled to the first mounting member;
    a second mounting member mountable to the lower support post of the support structure;
    a second plate coupled to the second mounting member;
    a bearing housing fastened between the first plate and the second plate wherein the bearing housing defines at least one opening; and,
    a ball bearing located in the at least one opening and contacting at least one of the first and second plates.

2. The breakaway coupling for a support structure of claim 1 wherein the bearing housing includes:
    a first bearing retainer layer positioned adjacent to the first plate;
    a second bearing retainer layer positioned adjacent to the second plate;
    a third bearing retainer layer positioned between the first bearing retainer layer and the second bearing retainer layer, the third bearing retainer layer having at least one opening sized to loosely receive the ball bearing;
    wherein the first and second bearing retainer layers each have at least one opening sized to retain the ball bearing in the bearing housing in an assembled position.

3. The breakaway coupling for a support structure of claim 2 wherein the first bearing retainer layer, the second bearing retainer layer and the third bearing retainer layer are all made of polypropylene.

4. The breakaway coupling for a support structure of claim 1 wherein the first mounting member and the second mounting member are tubes.

5. The breakaway coupling for a support structure of claim 4 wherein the first mounting member is welded to the first plate and the second mounting member is welded to the second plate.

6. The breakaway coupling for a support structure of claim 1 wherein the bearing housing has a plurality of openings and each opening has a ball bearing located in the opening and contacting at least one of the first and second plates.

7. The breakaway coupling for a support structure of claim 1 wherein the first plate is breakably coupled to the second plate by a plurality of nuts and bolts.

8. A support structure comprising:
    an upper mounting post;
    a lower support post;
    a breakaway coupling coupled to the upper mounting post and to the lower support post;
    wherein the breakaway coupling has:
        a first plate coupled to the upper mounting post;
        a second plate coupled to the lower support post and breakably coupled to the first plate;
        a bearing housing fastened between the first plate and the second plate, the bearing housing defining at least one opening; and
        a ball bearing located in the at least one opening and contacting at least one of the first and second plates.

9. The support structure of claim 8 wherein the first plate is coupled to the upper mounting post by a tube having a plurality of holes to permit coupling to the upper mounting post using at least one bolt passed through at least one of the plurality of holes in the tube.

10. The support structure of claim 8 wherein the second plate is coupled to the lower support post by a tube having a plurality of holes to permit coupling to the lower support post using at least one bolt passed through at least one of the plurality of holes in the tube.

11. The support structure of claim 8 wherein the bearing housing includes:
    a first bearing retainer layer positioned adjacent to the first plate;
    a second bearing retainer layer positioned adjacent to the second plate;
    a third bearing retainer layer positioned between the first bearing retainer layer and the second bearing retainer layer, the third bearing retainer layer having at least one opening sized to loosely receive the ball bearing;
    wherein the first and second bearing retainer layers each have at least one opening sized to retain the ball bearing in the bearing housing in an assembled position.

12. The support structure of claim 11 wherein the bearing housing has a plurality of openings and each opening has a ball bearing located in the opening and contacting at least one of the first and second plates.

13. A support structure comprising:
    an upper mounting post;
    a lower support post;
    a breakaway coupling coupled to the upper mounting post and to the lower support post;
    wherein the breakaway coupling has:
        a first plate coupled to the upper mounting post;
        a second plate coupled to the lower support post and breakably coupled to the first plate;
        a bearing housing fastened between the first plate and the second plate, the bearing housing defining at least one opening; and a bearing member located in the at least one opening and contacting at least one of the first and second plates;

wherein the bearing housing includes:
- a first bearing retainer layer positioned adjacent to the first plate;
- a second bearing retainer layer positioned adjacent to the second plate;
- a third bearing retainer layer positioned between the first bearing retainer layer and the second bearing retainer layer, the third bearing retainer layer having at least one opening sized to loosely receive the bearing member;
- wherein the first and second bearing retainer layers each have at least one opening sized to retain the bearing member in the bearing housing in an assembled position.

14. The support structure of claim 13 wherein the first bearing retainer layer, the second bearing retainer layer and the third bearing retainer layer are all made of polypropylene.

15. The support structure of claim 13 wherein the bearing housing has a plurality of openings and each opening has a bearing member located in the opening and contacting at least one of the first and second plates.

16. A breakaway coupling for a support structure having an upper mounting post and a lower support post comprising:

a first mounting member mountable to the upper mounting post of the support structure;

a first plate coupled to the first mounting member;

a second mounting member mountable to the lower support post of the support structure;

a second plate coupled to the second mounting member;

a bearing housing fastened between the first plate and the second plate wherein the bearing housing defines at least one opening;

a bearing member located in the at least one opening and contacting at least one of the first and second plates;

wherein the bearing housing includes:
- a first bearing retainer layer positioned adjacent to the first plate;
- a second bearing retainer layer positioned adjacent to the second plate;
- a third bearing retainer layer positioned between the first bearing retainer layer and the second bearing retainer layer, the third bearing retainer layer having at least one opening sized to loosely receive the bearing member;
- wherein the first and second bearing retainer layers each have at least one opening sized to retain the bearing member in the bearing housing in an assembled position.

\* \* \* \* \*